3,497,570
STABILIZED SILICONE ELASTOMERS
Kenneth B. Yerrick, Midland, Mich., assignor to Dow Corning Corporation, Midland, Mich., a corporation of Michigan
No Drawing. Filed Aug. 19, 1966, Ser. No. 573,450
Int. Cl. C08g 47/10
U.S. Cl. 260—827                    4 Claims

ABSTRACT OF THE DISCLOSURE

A homogeneous mixture of an essentially diorganopolysiloxane elastomer or fluid and polyacrylonitrile. The incorporation of the polyacrylonitrile substantially enhances the heat stability of the essentially diorganopolysiloxane or fluid.

---

This invention relates to the incorporation of certain materials into silicone elastomers and fluids to impart improved heat stability and more particularly to the inclusion of polyacrylonitrile in said elastomers and fluids to achieve the above purpose.

Silicone elastomers are useful in numerous applications and are commercially important due to their desirable physical properties, such as their dielectric characteristics and thermal stability at moderate temperatures. However, one disadvantage that has been continually encountered is that silicone elastomers tend to decompose when subjected to heat in the presence of air at elevated temperatures for prolonged or extended periods of time. This undesirable decomposition necessarily leads to a resultant loss of other physical properties whose presence are virtually required for acceptable silicone elastomers.

The use of iron oxide as a heat stabilizer in silicone elastomers is well known in the art. Also, rare earth metal oxides and hydroxides as a class have long been known to be excellent heat stability additives and most especially for the production of non-pigmented silicone elastomers. In addition, certain isolated metallic oxides and hydroxides have been employed to achieve heat stability in silicone elastomers. It has now been found that the inclusion of polyacrylonitrile results in silicone elastomers and fluids possessing excellent heat stability characteristics.

Thus, it is an object of this invention to provide silicone elastomers and fluids that can be subjected to heat at elevated temperatures for prolonged periods of time without fear of the deleterious effects aforementioned.

It is also an object of this invention to provide an additive for silicone elastomers and fluids that substantially improves its heat stability and which is economical, practical, and readily available.

These and other objects will become apparent from a consideration of the following detailed description of the invention.

This invention relates to a composition of improved heat stability of an essentially diorganopolysiloxane elastomer or fluid in which the organic radicals are selected from the group consisting of a monovalent hydrocarbon radical and a monovalent halohydrocarbon radical consisting of a homogeneous mixture of from 1.0 to 15.0 parts of polyacrylonitrile per 100 parts by weight of the essentially diorganopolysiloxane.

By the term "essentially diorganopolysiloxane" it is merely meant a polysiloxane primarily containing diorganosiloxane units, but which can also contain some triorganosiloxane, some monoorganosiloxane, and some $SiO_2$ units. These materials are well known in the art. The ratio of organic radicals to silicon atoms is preferably within the range of from 1.98:1 to 2.01:1. Generally, the preferred polymers are diorganopolysiloxanes endblocked with hydroxyl radicals, alkoxy radicals, vinyl radicals, acyl radicals, or hydrogen atoms. It is to be noted that the above-mentioned radicals can also be present along the polymer chain.

Preferably at least 50 percent of the organic radicals in the "essentially diorganopolysiloxane" are methyl radicals, however, for purposes of this invention, it is not required. For example, the remaining organic radicals can be a monovalent hydrocarbon radical or halogenated monovalent hydrocarbon radical. More specifically, the organic radicals can be alkyl radicals such as methyl, ethyl, isopropyl, t-butyl, 2-ethylhexyl, dodecyl, and octadecyl radicals; alkenyl radicals such as vinyl, allyl, and hexadienyl radicals; cycloalkyl radicals such as cyclopentyl, and cyclohexyl radicals; cycloalkenyl radicals such as cyclopentyl, and cyclohexenyl radicals; aryl radicals such as phenyl, naphthyl, and xenyl radicals; aralkyl radicals such as benzyl, phenylethyl, and xylyl radicals, and alkaryl radicals such as tolyl, and dimethylphenyl radicals. The above monovalent hydrocarbon radicals can be halogenated and hence, such radicals as chloromethyl, 3,3,3-trifluoropropyl, perchlorophenyl, 2,3-dibromocyclohexyl, $\alpha,\alpha,\alpha$-trifluorotolyl, 2,4-dibromobenzyl, trifluoromonochlorovinyl and $\beta,\beta$-trifluoro-$\alpha$-chlorocyclobutyl, and 2-iodocyclopentyl-3, among others are perfectly suitable in the present invention.

The siloxane polymers range from fluids having at least 100 siloxane units per molecule to nonflowing gums. In order to facilitate mixing the siloxanes they should be either readily deformable or soluble in an organic solvent such as benzene. Methods for preparing the siloxane polymers are well known in the art and the literature is replete with such references, hence further elaboration is deemed unnecessary.

Any curing system for the siloxane can be employed. For heat curing systems the common commercial vulcanizing agents are organic peroxides such as those containing at least one aromatic acyl radical in the molecule; for example, dialkyl peroxides and bis aralkyl peroxides. Peroxides are generally used in a ratio of from 0.1 to 10 parts of peroxide per 100 parts of siloxane. Examples of such catalysts are tertiarybutylperbenzoate, di-tertiarybutylperoxide, dicumyl peroxide and benzoyl peroxide, among others.

For room temperature vulcanizing systems a variety of catalysts are possible. Illustrative of these catalysts is mixing with an acid-free diorganopolysiloxane, a hydrocarbonoxy silicate in the presence of a metallic carboxylic acid salt. Another possibility comprises mixing with a hydroxylated diorganopolysiloxane a small amount of organohydrogensiloxane. Still a further method consists simply of exposing certain acyloxy-endblocked diorganopolysiloxanes to moisture.

As expected, the siloxane compositions of the present invention can also be cured by exposing them to high energy electrons or to electromagnetic radiation such as X-rays, gamma rays, ultraviolet light and the like.

The organopolysiloxanes defined herein can be unfilled or filled as desired. The fillers employed can be any of the inorganic heat stable fillers normally used with siloxane elastomers. Such fillers include metallic oxides such as titania, ferric oxide, zinc oxide, and the like; fibrous fillers such as asbestos and glass; and siliceous fillers such as diatomaceous earth and crushed quartz. It is of importance to note, however, that the benefits of the additive of this invention can be best realized with siloxane stocks incorporating any of the well-known reinforcing silica filler, e.g., fume silicas, silica aerogels and precipitated silicas, having a surface area of at least 50 square meters per gram. If desired, these fillers can have organosilyl groups attached to the surface thereof. From 20 to 200 parts, but generally from 20 to 80 parts, of the reinforcing silica fillers are used per 100 parts of siloxane whereas up to 400 parts of other fillers can be employed. The amount of the filler has no effect of the stabilizing action of the additives of this invention.

The heat stabilizing additive of the present invention is a well-known polyacrylonitrile having repeating units of the formula

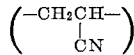

To effect the objects of the present invention, the size of the acrylonitrile polymer is not critical with the exception that there must be at least 2 of the indicated repeating units present. At least 1.0 part by weight of the polyacrylonitrile must be added per 100 parts by weight of siloxane in order to substantially improve the heat stability of the siloxane. The effect of this additive increases generally with the amount of additive until 2.5 to 15.0 parts have been added per 100 parts of siloxane. Subsequent addition of the additive produces a correspondingly less improvement in the ultimate stock up to approximately 20.0 parts of additive per 100 parts of siloxane after which further addition imparts only a negligible improvement in the heat stability of the siloxane and may destroy the ultimate material.

The compositions of this invention are useful in any application where heat stabilized elastomers and fluids are desired and particularly in applications where the heat conditions are of a severe nature.

The following examples are merely illustrative and are not intended to limit the scope of the invention which is properly delineated in the claims.

EXAMPLE 1

100 parts of a high molecular weight polymer gum consisting of .142 mol percent methylvinylsiloxane units, 99.858 dimethylsiloxane units, and endblocked with dimethylvinylsiloxane units, 35 parts of a fume silica, 10 parts of a hydroxyl endblocked dimethylpolysiloxane having a viscosity of approximately 35 cs. at 25° C., and 1.0 part of powdered polyacrylontrile were physically blended on a two-roll rubber mill until well dispersed. To the above was added 0.5 part of t-butylperbenzoate and the formulation was press molded in an air circulating oven at 150° C. for ten minutes. The material was then after-cured for a period of one hour at 150° C. to drive off all volatiles.

Additional formulations were prepared which were identical to the above with the exception that they contained 0 to 5.0 parts of powdered polyacrylontrile. Tests were then conducted to determine the stabilizing effect of the presence of the polyacrylonitrile.

The following results were obtained:

| Sample | Cure | Parts polyacrylonitrile | Durometer | Max. Tensile, p.s.i. | Percent Elongation | Modulus at 100% elongation |
|---|---|---|---|---|---|---|
| 1 | 1 hr./150° C | 0 | 48 | 865 | 585 | 110 |
| 2 | 1 hr./150° C | 1.0 | 48 | 920 | 580 | 115 |
| 3 | 1 hr./150° C | 5.0 | 53 | 900 | 505 | 135 |
| 4 | 4 hr./250° C | 0 | 50 | 990 | 565 | 105 |
| 5 | 4 hr./250° C | 1.0 | 48 | 1,040 | 565 | 110 |
| 6 | 4 hr./250° C | 5.0 | 50 | 980 | 535 | 135 |
| 7 | 24 hr./316° C | 0 | Sample destroyed by heat | | | |
| 8 | 24 hr./316° C | 1.0 | 68 | 510 | 115 | Hard |
| 9 | 24 hr./316° C | 5.0 | 60 | 800 | 280 | |
| 10 | 96 hr./316° C | 0 | Sample destroyed by heat | | | 560 |
| 11 | 96 hr./316° C | 1.0 | 89 | 585 | 20 | Hard |
| 12 | 96 hr./316° C | 5.0 | 76 | 805 | 140 | 620 |

As noted in the above table, the presence of polyacrylonitrile became critical when the cure extended beyond 4 hours at 250° C. Absent the stabilizer, at elevated temperatures for prolonged periods of time, the samples were destroyed and unable to test. Samples 8 through 12 illustrate the necessity of a preferred amount of the heat stabilizer. With only 1.0 part of the stabilizer present for 96 hours at 316° C., the properties decreased to a great degree, whereas with 5.0 parts of the stabilizer present, the properties were substantially maintained.

EXAMPLE 2

When polyacrylonitrile was added to dimethylpolysiloxane fluids having viscosities of 100 cs., 500 cs., 1000 cs., 10,000 cs., 50,000 cs., 250,000 cs., 500,000 cs., and 100,000 cs., at 25° C. and subsequently tested for heat stability at severe temperatures for prolonged periods of time, no heat degradation was noted; whereas the same fluids without the polyacrylonitrile added readily decomposed.

That which is claimed is:

1. A composition of improved heat stability of an essentially diorganopolysiloxane elastomer or fluid in which the organic radicals are selected from the group consisting of a monovalent hydrocarbon radical and a monovalent halohydrocarbon radical consisting of a homogeneous mixture of from 1.0 to 15.0 parts of polyacrylonitrile per 100 parts by weight of the essentially diorganopolysiloxane.

2. The composition as recited in claim 1 wherein there is 5.0 parts of polyacrylonitrile per 100 parts by weight of the essentially diorganopolysiloxane.

3. The composition as recited in claim 2 wherein the essentially diorganopolysiloxane is an elastomer.

4. The composition as recited in claim 2 wherein the essentially diorganopolysiloxane is a fluid.

References Cited

UNITED STATES PATENTS 2,959,569   11/1960   Warrick _____ 260—827
3,070,573   12/1962   Beck _____ 260—827

SAMUEL H. BLECH, Primary Examiner

U.S. Cl. X.R.

204—159.13; 252—78; 260—41, 45.9, 448.2